United States Patent [19]
Poot et al.

[11] 4,087,564
[45] May 2, 1978

[54] FRACTIONATED CO-RANDOMIZED FAT BLEND AND USE

[75] Inventors: Cornelis Poot; Charles Cornelis Verburg, both of Vlaardingen, Netherlands; Douglas Chater Kirton, Grays; Avril Brown MacNeill, Gravesend, both of England

[73] Assignee: Lever Brothers Company, New York, N.Y.

[21] Appl. No.: 663,021

[22] Filed: Mar. 2, 1976

[30] Foreign Application Priority Data

Mar. 4, 1975 United Kingdom ............... 8938/75

[51] Int. Cl.² ............................................. A23D 3/00
[52] U.S. Cl. ..................................... 426/603; 426/607
[58] Field of Search ....................... 426/603, 607, 601

[56] References Cited

U.S. PATENT DOCUMENTS

| | | | |
|---|---|---|---|
| 2,855,311 | 10/1958 | Nelson | 426/603 |
| 3,939,282 | 2/1976 | Carlile et al. | 426/607 X |
| 3,956,522 | 5/1976 | Kattenberg et al. | 426/607 X |

*Primary Examiner*—Joseph M. Golian
*Attorney, Agent, or Firm*—Kenneth F. Dusyn; James J. Farrell; Melvin H. Kurtz

[57] ABSTRACT

The invention provides a fat product especially suitable for preparing margarines and low fat spreads of improved butter-like properties, particularly in respect of plasticity and oral melt. The fat product comprises an olein fraction of a co-randomized fat blend which contains 30–46% of palmitic acid residues and 42–62% of cis-mono- and all-cis-poly-unsaturated fatty acid residues with a chain length of 18 carbon atoms.

18 Claims, No Drawings

FRACTIONATED CO-RANDOMIZED FAT BLEND AND USE

The present invention relates to a fat product suitable for the preparation of shortenings and emulsified food spreads such as margarines and low fat spreads as well as to margarines and low fat spreads prepared from such a fat product.

The food spreads prepared from the fat product of the invention have improved butter-like properties.

Butter-like properties of margarines and low fat spreads are mainly attributable to the nature of their fat blend. Suitable fat blends for such butter-like products provide a decreased collar formation when a rod is inserted in the product. Furthermore the butter-like properties can be ascertained by manual and organoleptic assessment of the products.

The present invention provides a new fat product from which shortenings and emulsified food spreads like margarine and low fat spreads can be prepared, which food spreads at least as far as consistency is concerned closely resemble butter.

The fat product of the present invention comprises an olein fraction of a co-randomised fat blend, the fraction containing 30–46% of palmitic acid residues and 42–62% of cis-mono and all cis poly-unsaturated fatty acid residues with a chain length of 18 carbon atoms.

Preferably the fat product comprises an olein fraction of a co-randomised fat blend of:

(i) a fat having a palmitic acid content of 30% or more, and
(ii) a vegetable fat containing at least 80% of fatty acids with a chain length of 18 carbon atoms or more, at least part of which fatty acids are all cis-unsaturated fatty acids with a chain length of 18 carbon atoms, in such a weight ratio of (i) to (ii) that the fat product contains 30 to 46% of palmitic acid residues,
42 to 62% of cis-mono- and all cis-poly-unsaturated fatty acids residues, with a chain length of 18 carbon atoms, up to 15% of saturated fatty acid residues with a chain length of 14 carbon atoms or less, and up to 5%, particularly up to 3 or 4% of triglycerides of saturated fatty acids with a chain length of 16 carbon atoms or more.

The fraction of the co-randomised fat is a triglyceride mixture obtained by a fractionation treatment effected under the influence of heat, i.e. at such a temperature that separation in essentially solid and essentially liquid triglycerides is possible.

The fraction to be used in the fat product of the invention is the olein fraction i.e. the fraction containing the lower melting constituents of the co-randomised fat or fats.

Suitably the olein fraction contains 55 to 95, especially 70 to 90 percent by weight of the lower melting constituents of the randomised fat; consequently some 5 to 45, particularly 10 to 30 percent by weight of stearins, i.e. the higher melting constituents of the co-randomised fats should be removed.

Preferably the fat product of the invention contains no more than 5% of saturated fatty acid residues of a chain length of 14 carbon atoms or less; preferably the ratio of palmitic fatty acid residues to saturated fatty acid residues with a chain length of 18 carbon atoms and more ranges from 3 to 15, particularly from 4.5 to 10.

Especially the invention provides a fat product in which the ratio of the total content of fatty acid residues with a chain length of 16 to 18 carbon atoms to the content of the same fatty acid residues at the 2-position of the glyceride molecules ranges from 0.9 to 1.3, particularly 0.95 to 1.15.

Apart from the one or more fractions of randomised fat or fats, the fat product of the invention can comprise a minor proportion, e.g. up to about 30%, preferably up to about 15% by weight of the fat product of additional non-randomised fats.

Of course such additional fats and such proportions should be chosen that the previously described fatty acid and triglyceride composition of the product is not adversely affected.

In this specification the terms "fat" and "oil" are used as synonyms, unless otherwise specified; the terms "food spread", "margarine", and "low fat spread" refer to water-in-fat emulsions containing the fat blend of the invention and optionally suitable amounts of fat-soluble emulsifiers e.g. partial fatty acid glycerides like monoglycerides, phosphatides, and fractions thereof, etc. and/or water-soluble emulsifiers, e.g. partial glycerides, phosphatides, egg-yolk, proteins etc.

The term "randomised" refers to the interchange of the fatty acid radicals of the glycerides on the glycerol radicals in random fashion. This interchange, when applied to at least two different fat sources is called "co-randomising" and can for instance be effected under the influence of an interesterification catalyst at temperatures ranging from about 25° to 175°, preferably 80° to 140° C. Suitable interesterification catalysts are for instance alkali metals, their alloys, their hydroxides, their alkoxides e.g. in proportions of 0.01 to 0.3% or 0.5% by weight of the fat blend to be interesterified. "Randomised fats" are fats that have been subjected to a randomising treatment.

The balance of the fatty acid residues of the fat product of the invention essentially consists of all cis-unsaturated fatty acids with a chain length of 20 carbon atoms or more, saturated fatty acids of a chain length of 18 carbon atoms or more and trans-unsaturated fatty acids. Preferably the total content of saturated and trans-unsaturated fatty acid residues with a chain length of 18 carbon atoms and of all-cis-unsaturated fatty acid residues of a chain length of 20 carbon atoms or more is 0 to 26%, preferably 6–17.5%, calculated on the total fatty acid content of the fat product of the invention.

The palmitic acid content preferably is from 32, particularly 35 to 45, more particularly 36 to 40% and the content of cis-mono and all cis-poly-unsaturated fatty acid residues of a chain length of 18 carbon atoms is from 46.0 to 57.0% especially from 50.0 to 55.0%.

Suitable fats of class (i) are for instance palm oil and mixtures of palm oil with fish, lard and/or cottonseed oil and/or tallow as well as hydrogenated and/or fractionated derivatives of such fats.

Examples of fats of class (ii) are for instance sunflower, safflower, soybean, maize, groundnut, rapeseed, rice, wheat germ and tobacco seed oil as well as hydrogenated and/or fractionated derivatives of such fats. Suitable fats that can be added to the oleins of the randomised fats are for instance palm oil, cottonseed oil, sunflower oil, safflower oil, soybean oil, maize oil, groundnut oil as well as slightly hydrogenated and/or fractionated derivatives of such oils.

The fat product of the invention is particularly of importance in emulsions containing from 40 to 50 up to 85% of a fatty phase, the balance of the emulsion being an aqueous phase, which can be e.g. water, milk or skim milk adjusted to the required pH value e.g. 4 or 4.5 to 6 or 7 and which can contain, apart from suitable water-soluble emulsifiers, various minor ingredients e.g. salt, acid, proteins, flavours, preservatives etc.

In this specification all percentages, proportions and parts are by weight unless otherwise specified. The amount of fat in the emulsion is based on the weight of the emulsion, the amount of various fats in the fat product is based on the weight of said fat product and the amount of fatty acids in a fat is based on the total amount of fatty acids in said fat, unless stated otherwise.

The invention also provides a process for preparing the fat product of the invention, which comprises:
  A. Randomly rearranging:
    (i) a fat having a palmitic acid content of 30% or more, with
    (ii) a vegetable fat containing at least 80% of fatty acids with a chain length of 18 carbon atoms or more, at least part of which fatty acids are all-cis-unsaturated fatty acids with a chain length of 18 carbon atoms,
  B. removing the higher melting constituents of the randomised fat by fractionation until the total content of tri-saturated glycerides of fatty acids with a chain length of 16 carbon atoms or more is at most 5%, the weight ratio of fats (i) and (ii) being chosen in such a way that after fractionation the palmitic acid content of the fat product is from 30 to 46%, the content of cis-mono and all-cis-polyunsaturated fatty acids with a chain length of 18 carbon atoms is 40 to 62% and the content of saturated fatty acid residues with a chain length of 14 carbon atoms or less is up to 15%.
  C. blending 70 to 100% of the fractionated randomised fat so obtained with 30 to 0% of additional non-randomised fats.

The proportion of higher melting constituents to be removed from the randomised fat ranges from 5 to 45%, preferably 10–30%. The fractionation can be carried out by various methods known per se, e.g. dry-fractionation or fractionation with the aid of solvents or in the presence of an aqueous solution containing a small amount of a wetting agent. Suitably dry-fractionation is effected by heating the co-randomised fat to about 45° to 65° C, subsequently regularly cooling it to 34°–38° C, preferably 36°–38° C, in about 0.5 to 3 hours and subsequently keeping it at this temperature e.g. for at least 5 hours, preferably 10 to 28 hours. The cooling treatment is preferably carried out with gentle stirring and after the crystallisation period the stearins are filtered off and the olein is obtained in a yield of about 60 to 95%, depending on the fatty acid composition of the fats to be fractionated. Preferably 5 to 15% of stearins are removed from a co-randomised fat of a palmitic acid content of 30 to 35%, 10 to 20% stearins are removed when the palmitic acid content of the co-randomised fat is 35 to 40% and 15 to 30% stearins are removed when the palmitic acid content is within the range of 40 to about 46%.

The margarines can be prepared by emulsifying a suitable aqueous phase in a suitable proportion with the fat product of the invention and chilling and working the mass in a conventional manner. The aqueous phase can contain additives which are customary for margarine, for example emulsifying agents, salt and flavours. Oil-soluble additives e.g. flavouring compounds, vitamins etc. can be included in the fatty phase. Generally the proportion of fatty phase in a margarine varies from about 75 to 85% of the emulsion, depending on local statutory requirements for margarine. Alternatively higher proportions of the aqueous phase can be adopted in the production of low-fat spreads, which can contain as little as 35, 40 or 50 up to 60% by weight of fat.

The emulsions, particularly the margarine, can be manufactured in a conventional closed tubular surface-scraped exchanger as described in "Margarine" by A. J. C. Andersen and P. N. Williams, Pergamom Press 1965, pp. 246 et seq. Votator arrangements described in British patent specifications Nos. 639,743, 650,481 and 765,870 are particularly suitable. Alternatively, emulsions can be prepared by means of a phase inversion process as described in British patent specification No. 1,215,868 or on conventional cooling drums in the same book by Andersen and Williams.

The invention will be illustrated by the following Examples (I–XXII (The "Control" experiments illustrate conditions outside the scope of the present invention; from these "controls" the criticality of the limitations as claimed become evident).

Fat blends were prepared by co-randomising palm oil, hydrogenated palm oil, soybean oil, hydrogenated soybean oil, rapeseed oil, coconut oil, etc.

PREPARATION OF HARDENED FATS

Soybean oil of an Iodine Value of 133 was hydrogenated at 105° C while using 0.1% of nickel on Kieselguhr catalyst (calculated as percentage of nickel on oil). After reaching an Iodine Value of 95 and a melting point of 28° C the catalyst was filtered off and the oil was conventionally refined. Part of the hydrogenated soybean oil thus obtained was hydrogenated at 108° C to an m.p. of 36° C after addition of 0.2% of a sulphurized nickel catalyst. The catalyst was removed and the oil was conventionally refined. Similarly the hydrogenated maize, groundnut, sunflower and cottonseed oils were prepared, however, without the first hydrogenation step with the freshly precipitated nickel catalyst. The iodine values of these oils were about 75. The palm oil of a melting point of 58% C was hydrogenated with 0.1% of the freshly precipitated nickel catalyst at 110° C until the iodine value was no more than 1.

CO-RANDOMISING

The fats to be co-randomised were dried to a water content of about 0.01% by weight and subsequently co-randomised at 90° C in a stirred vessel which was kept under a vacuum of 2 cm mercury, in the presence of 0.1% of sodium methoxide as a catalyst. After 20 minutes the mixture was cooled and the vacuum released. The catalyst was destroyed by washing the co-randomised blend with water and the fat was dried as before, and conventionally refined.

MARGARINE PREPARATION

The margarine fat blend was melted and emulsified with an aqueous phase prepared from soured milk containing 0.1% mono-diglycerides to give an emulsion containing 80% of fat.

The emulsion was crystallised and worked in two closed tubular surface-scraped heat exchangers (Votator A-units); the latter of the two was left at a temperature of 10°–15° C. Between said Votator A-units a slowly agitated uncooled crystallizer was placed for increasing the residence time to about 2–3 minutes. The crystallised emulsion leaving the latter Votator A-unit was then passed through a resting tube (Votator B-unit), where it crystallised further for about 3 minutes. The margarine was then packed.

Low-calorie spreads were prepared as follows:

For the preparation of a low-calorie spread with good spreadability at refrigerator temperature and a very satisfactory melting behaviour, 4t of the fat blend were mixed with 4 kg of a high-melting distilled monoglyceride and 12.5 kg of a distilled sunflower oil monoglyceride. This fat phase was mixed and emulsified with 6t of a water phase containing 1% of salt and sufficient citric acid to maintain a pH in the emulsion of 4.2 in a conventional Votator arrangement.

The votated product was tub-filled and possessed the described properties in the fresh state and also after 6 weeks' storage at 15° C.

The assessment of the butter-like margarines and low fat spreads prepared according to the invention was carried out as follows:

The plasticity of a product was ascertained by slowly inserting a metal rod of 5 mm diameter into the cold product (10° C) and observing the degree of collar formation, which is expressed as:

2 = very strong formation, fractures observed,
4 = strong collar formation, fractures observed,
6 = collar formation, fractures observed,
8 = slight collar formation, no fractures observed,
10 = no collar formation, while the other marks gave intermediate gradations. Scores 8–10 indicate excellent butter-like properties.

The samples were further assessed on "general resemblance to butter" by a skilled panel; manual and visual assessment of the product was rated as follows:

1 = very little resemblance,
3 = little resemblance,
5 = moderate resemblance to butter,
8 = good resemblance,
10 = indistinguishable from butter, while other marks gave intermediate gradations.

With respect to the organoleptic properties the samples were subjected to an "eating-quality" test. This test was carried out under the following conditions: the blocks of margarine to be tested were stored at 15° C at least 24 hours. Samples of 1 gram were then made with a sample cutter.

One or more pats of the product to be tested were placed for each member of the panel on a previously cooled piece of grease-proof paper. One pat was put in the mouth and chewed with regular movement of about two per second. The test subjects receive an impression of the "mouth feel" of the molten sample. The assessment was expressed in marks ranging from 1 to 10, in which:

1 = thick, highly viscous, chewy
5 = moderate
10 = very thin melting while the other marks give intermediate gradations.

The composition of the fat blend used, their content of palmitic acid, all-cis-unsaturated fatty acids of a chain length of 18 carbon atoms, the content of trisaturated glycerides of fatty acids with a chain length of 16 to 18 carbon atoms, etc., as well as the results of the plasticity assessment and panel assessments of the margarines and low fat spreads are compiled in the accompanying Table 1, covering Examples I to XXII.

EXAMPLES XXIII AND XXIV

Margarines were prepared as described in the previous examples except that for Example XXIII a fat product was used consisting of a 50/50 mixture of the fat products of Examples XIV and XIX and for Example XXIV a 80/20 mixture of the fat products of Example X and a co-randomised fat blend of equal parts of palm oil and soyabean oil of a melting point of 28° C.

The results were:

| | FATTY ACID COMPOSITION Total fat blend | | | Further characterstics | | |
|---|---|---|---|---|---|---|
| Palmitic acid (%) | Cis-unsaturated fatty acid of chain length 18C (%) | saturated ≧ C18, trans-cis-unsaturated ≧ C20 | saturated fatty acid of chain length ≦ 14C (%) | Trisaturated glycerides of fatty acids with chain length C16 or more (%) | Saturated C16 / Saturated C1 or more | Saturated C16 + C18 / Sat. (C16 + C18) on 2.pos. |
| Example no. XXIII | | | | | | |
| 35 | 50 | 14 | 1 | 1 | 5.9 | 1.05 |
| Example no. XXIV | | | | | | |
| 32 | 52 | 15 | 1 | 2 | 4.0 | 1.01 |

| Hardness at 20° C* | Hardness at 10° C+ | Plasticity (collar) | Consistency product General resemblance (score) | Melting properties (score) |
|---|---|---|---|---|
| | | | Example no. XXIII | |
| 180 | 1025 | 8 | 8 | 8 |
| | | | Example no. XXIV | |
| 250 | 1010 | 7 | 8 | 7 |

*should preferably be at least 100 g/cm².
+preferably no more than 1500 g/cm².

TABLE I

FAT COMPOSITION OF CO-RANDOMISED FAT

| Example | Palm oil (unhydrogenated) | Palm oil, hydrogenated to melting point 58°C | Palm oil (stearin) melting point 48°C | Lard (unhydrog.) | Cottonseed oil (unhydrog.) | Fish oil, hydrogenated to melting point 30°C | Soybean oil, unhydrogenated | Soybean oil, hydrogenated to melting point 28°C | Soybean oil, hydrogenated to melting point 36°C | Rapeseed oil | Coconut oil | Sunflower oil | Sunflower oil, hydrogenated to melting point 33°C | Maize oil | Maize oil, hydrogenated to melting point 33°C | Groundnut oil, hydrogenated to melting point 30°C | Fractionation Stearins removed (%) | Additional fats (%) |
|---|---|---|---|---|---|---|---|---|---|---|---|---|---|---|---|---|---|---|
| I | 70 | — | — | — | — | — | — | 30 | — | — | — | — | — | — | — | — | 15 | — |
| II | 70 | — | — | — | — | — | — | 30 | — | — | — | — | — | — | — | — | 25 | — |
| III | 75 | — | — | — | — | — | — | 25 | — | — | — | — | — | — | — | — | 16 | — |
| IV | 85 | — | — | — | — | — | — | 15 | — | — | — | — | — | — | — | — | 19 | — |
| V | 95 | — | — | — | — | — | — | — | 5 | — | — | — | — | — | — | — | 27 | — |
| VI | 70 | — | — | — | — | — | 15 | 15 | — | — | — | — | — | — | — | — | 9 | — |
| VII | 85 | — | — | — | — | — | — | 5 | 10 | — | — | — | — | — | — | — | 29 | — |
| VIII | 70 | 8 | — | — | — | — | — | — | — | — | — | — | — | — | — | — | 5 | — |
| IX | 80 | — | — | — | — | — | — | 15 | — | — | 5 | — | — | — | — | — | 20 | — |
| X | 62 | — | — | — | — | — | — | 30 | — | — | — | — | — | — | — | — | 25 | 10⁺ 20ˣ |
| XI | 70 | — | — | — | — | — | — | 15 | — | — | — | — | — | — | — | — | 15 | — |
| XII | 85 | — | — | — | — | — | — | 25 | 10 | — | — | — | — | — | — | — | 20 | — |
| XIII | — | — | 40 | — | — | — | 35 | — | — | — | — | — | — | — | — | — | 35 | — |
| XIV | 60 | — | — | — | 20 | 15 | — | 10 | — | — | — | — | — | — | — | — | 20 | — |
| XV | 65 | — | 30 | — | — | — | — | 10 | — | — | — | — | — | — | — | — | 40 | — |
| XVI | 80 | — | — | — | — | — | 20 | 10 | — | — | — | — | 20 | 10 | — | — | 20 | — |
| XVII | 85 | — | — | — | — | — | — | 10 | — | — | — | — | 5 | — | — | — | 25 | — |
| XVIII | 90 | — | — | — | — | — | — | — | — | — | — | — | — | — | 10 | 10 | 30 | — |
| XIX | 70 | — | — | — | — | — | — | 30 | — | — | — | — | — | — | — | — | — | — |
| XX | 80 | — | — | — | — | — | — | 30 | — | — | — | — | — | — | — | — | 25 | — |
| XXI | 85 | — | — | 50 | — | — | — | 3 | 17 | — | — | — | — | — | — | — | 25 | 10⁻ 20⁺ |
| XXII | 65 | — | — | — | — | — | — | 15 | — | — | — | — | — | — | — | — | 0 | — |
| Control | 75 | — | — | — | — | — | — | 35 | 25 | — | — | — | — | — | — | — | 15 | — |
| Control | 65 | — | — | — | — | — | 35 | — | — | — | — | — | — | — | — | — | 20 | — |
| Control | 56 | 14 | — | — | — | — | — | — | 30 | — | — | — | — | — | — | — | 10 | — |
| Control | 70 | — | — | — | — | — | — | 10 | — | — | 20 | — | — | — | — | — | 25 | — |

⁺ palm oil
ˣ soyabean oil
⁻ cottonseed oil hydrogenated to 35°C
⁺ sunflower oil

TABLE I-continued

| | Fatty acid composition total fat product (%) | | | | | Further characteristics of fat product | | | Consistency of product | | | | |
|---|---|---|---|---|---|---|---|---|---|---|---|---|---|
| Example | Palmitic acid | Cis-unsaturated fatty acid; chain length 18C | Saturated ≧ C18, trans-cis-unsaturated | Saturated fatty acid of chain length ≦ 14C | Trisaturated glycerides of fatty acids with chain length C16 or more (%) | weight ratio: Saturated C16 / Saturated C18 or more | weight ratio: Saturated (C16 + C18) / Sat. (C16 + C18) on 2-pos. | Hardness at 20° C$^x$ | Hardness at 10° C$^+$ | Plasticity (collar formation) | General resemblance (score) | Melting properties (score) | Remarks |
| I | 34.6 | 52.0 | 11.9 | 1.5 | 1.0 | 5.7 | 1.01 | 100 | 1100 | 8 | 8 | 9 | Margarine |
| II | 34.2 | 52.7 | 12.0 | 1.1 | 0.8 | 5.7 | 1.00 | 70 | 450 | 8 | 7 | 9 | Low fat spread (40% fat, 60% aqueous phase |
| III | 35.6 | 53.8 | 10.0 | 0.6 | 1.0 | 7.3 | 1.08 | 140 | 890 | 8 | 8 | 7 | " |
| IV | 38.6 | 52.6 | 7.8 | 1.0 | 2.0 | 8.1 | 0.98 | 200 | 1200 | 8 | 8 | 8 | " |
| V | 42.6 | 49.2 | 7.3 | 0.9 | 3.5 | 9.9 | 1.02 | 250 | 1500 | 9 | 8 | 6 | " |
| VI | 35.8 | 55.9 | 7.5 | 0.7 | 1.0 | 7.9 | 0.97 | 120 | 450 | 8 | 8 | 9 | " |
| VII | 41.0 | 46.5 | 11.4 | 1.1 | 1.0 | 9.3 | 1.03 | 160 | 1250 | 9 | 8 | 8 | Margarine |
| VIII | 32.1 | 47.0 | 19.9 | 1.0 | 1.4 | 7.1 | 1.02 | 70 | 450 | 9 | 7.5 | 7 | " |
| IX | 37.5 | 49.7 | 7.6 | 5.2 | 1.0 | 7.5 | 1.03 | 140 | 570 | 8 | 7 | 8 | " |
| X | 34.2 | 51.0 | 7.6 | 0.6 | 1.2 | 4.3 | 0.99 | 300 | 960 | 7 | 7 | 8 | " |
| XI | 35.9 | 50.8 | 14.2 | 1.1 | 1.7 | 5.9 | 1.09 | 180 | 1000 | 7 | 8 | 7 | " |
| XII | 33.1 | 58.7 | 11.5 | 0.8 | 1.5 | 7.6 | 1.09 | 70 | 1500 | 9 | 8 | 8 | " |
| XIII | 40 | 48 | 6.8 | 1 | 1 | 6.7 | 1.07 | 105 | 800 | 8 | 8 | 7 | " |
| XIV | 31 | 52 | 11 | 2 | 2 | 5.1 | 1.01 | 175 | 900 | 7 | 7 | 8 | " |
| XV | 32 | 51 | 16 | 2 | 1 | 6.4 | 1.03 | 250 | 1050 | 8 | 7 | 8 | " |
| XVI | 34 | 52 | 15 | 1 | 3 | 4.2 | 1.03 | 125 | 1315 | 7 | 7 | 7 | " |
| XVII | 35 | 57 | 8 | 1 | 2 | 7.0 | 1.06 | 100 | 775 | 7 | 8 | 7 | " |
| XVIII | 37 | 50 | 7 | 1 | 1 | 6.1 | 0.98 | 250 | 1550 | 8 | 7 | 8 | " |
| XIX | 40 | 47 | 12 | 1 | 2 | 6.7 | 1.01 | 170 | 1200 | 7 | 8 | 7 | " |
| XX | | | 12 | | | 6.7 | 1.05 | | | 8 | 8 | | " |
| XXI | 33 | 451 | 15 | 1 | 3 | 6.6 | 1.01 | 260 | 1500 | 8 | 7 | 7 | " |
| XXII | 32 | 53 | 14 | 1 | 2 | 5.4 | 1.05 | 150 | 850 | 8 | 8 | 7 | " |
| control | 39 | 52 | 8 | | 8 | 7.8 | 1.00 | 750 | 2400 | 8 | 6 | 2 | " |
| control | 29 | 58 | 12 | 1 | 0 | 5.8 | n.d. | too soft | 400 | 8 | 5 | 8 | " |
| control | 37 | 41 | 21 | | 4 | 6.2 | n.d. | 620 | 2300 | 7 | 6 | 4 | " |
| control | 31 | 64 | 4 | | 2 | 7.7 | n.d. | too soft | 160 | 8 | 6 | 8 | " |
| control | 33 | 48 | 18 | 1 | 2 | 2.7 | n.d. | 310 | 1100 | 6 | 5 | 7 | " |
| control | 32 | 45 | 6 | 17 | 1 | 7. | n.d. | 100 | 1500 | 6 | 5 | 8 | " |

$^x$ should preferably be at least 100 gm/cm²
$^+$ preferably no more than 1500 g/cm²
n.d. means not determined
≧ indicates "equal to or more than"
≦ indicates "equal to or less than"

We claim:

1. Fat product consisting essentially of:
   A. up to 30% of non-randomized fats, and
   B. an olein fraction of a co-randomized fat blend of:
      (i) a fat having a palmitic acid content of 35% or more, and
      (ii) a vegetable fat containing at least 80% of fatty acids with a chain length of 18 carbon atoms or more, at least part of which fatty acids are all cis-unsaturated fatty acids with a chain length of 18 carbon atoms, in such a weight ratio of fats (i) and (ii) that the fat product contains:
      30 to 46% of palmitic acid residues,
      42 to 62% of cis-mono and all-trans-polyunsaturated fatty acid residues, with a chain length of 18 carbon atoms,
      up to 15% of saturated fatty acid residues with a chain length of 14 carbon atoms or less, and
      up to 5% of triglycerides of saturated fatty acids with a chain length of 16 carbon atoms or more.

2. Fat product according to claim 1 in which the olein fraction contains 65 to 95 percent by weight of the lower melting constituents of the randomised fat.

3. Fat product according to claim 2 in which the olein fraction contains 70 to 90 percent by weight of the lower melting constituents of the randomised fat.

4. Fat product according to claim 1 in which the proportion of saturated fatty acids with a chain length of 14 carbon atoms or less is no more than 5%.

5. Fat product according to claim 1 in which the weight ratio of palmitic fatty acid residues to saturated fatty acid residues with a chain length of 18 carbon atoms or more ranges from 3 to 15.

6. Fat product according to claim 5 in which the weight ratio ranges from 4.5 to 10.

7. Fat product according to claim 1 in which the weight ratio of the total content of fatty acid residues with a chain length of 16 to 18 carbon atoms to the content of the same fatty acids at the 2-position of the glyceride molecules ranges from 0.9 to 1.3.

8. Fat product according to claim 7 in which the weight ratio ranges from 0.95 to 1.15.

9. Fat product according to claim 1 further comprising up to 15% of non-randomised fats.

10. Fat product according to claim 1 in which the total content of saturated and trans-unsaturated fatty acid residues with a chain length of 18 carbon atoms or more and of all-cis-unsaturated fatty acids with a chain length of 20 carbon atoms or more is 0 to 26%.

11. Fat product according to claim 10 in which the total content is 6–17.5%.

12. Fat product according to claim 1 in which the content of palmitic acid residues is from 32 to 45%.

13. Fat product according to claim 12 in which the content of palmitic acid residues is from 36 to 40%.

14. Fat product according to claim 1 in which the content of cis-mono- and all-cis-poly-unsaturated fatty acid residues of a chain length of 18 carbon atoms is from 46.0 to 57.0%.

15. Fat product according to claim 14 in which the content of cis-mono- and all-cis-poly-unsaturated fatty acid residues of a chain length of 18 carbon atoms is from 50.0 to 55.0%.

16. A margarine in which the fat portion consisting essentially of the fat product defined in claim 1.

17. A low calorie food spread in which the fat portion consisting essentially of the fat product defined by claim 1.

18. Process for preparing a fat product which comprises
   A. Randomly rearranging:
      (i) a fat having a palmitic acid content of 30% or more,
      (ii) a vegetable fat containing at least 80% of fatty acids with a chain length of 18 carbon atoms or more, at least part of which fatty acids are all-cis-unsaturated fatty acids with a chain length of 18 carbon atoms,
   B. removing the higher melting constituents of the randomised fat by fractionation until the total content of tri-saturated glycerides of fatty acids with a chain length of 16 carbon atoms or more is at most 5%, the weight ratio of fats (i) and (ii) being chosen in such a way that after fractionation the palmitic acid content of the fat product is from 30 to 46%, the content of cis-mono-and all-cis-poly-unsaturated fatty acids with a chain length of 18 carbon atoms is 40 to 62% and the content of saturated fatty acid residues with a chain length of 14 carbon atoms or less is up to 15%,
   C. blending 70 to 100% of the fractionated randomised fat so obtained with 30 to 0% of additional non-randomised fats.

* * * * *

UNITED STATES PATENT AND TRADEMARK OFFICE
CERTIFICATE OF CORRECTION

PATENT NO. : 4,087,564
DATED : May 2, 1978
INVENTOR(S) : Poot et al.

It is certified that error appears in the above-identified patent and that said Letters Patent are hereby corrected as shown below:

In the claims:

Claim 1, column 11, line 5: change "35%" to -- 30% --.

Claim 1, column 11, line 14: change "all-trans-poly-" to -- all-cis-poly- --.

Claim 16, column 12, line 17: change "consisting" to -- consists --.

Claim 17, column 12, line 20: change "consisting" to -- consists --.

Signed and Sealed this

Nineteenth Day of September 1978

[SEAL]

Attest:

RUTH C. MASON
Attesting Officer

DONALD W. BANNER
Commissioner of Patents and Trademarks